March 8, 1938.     T. C. KEEFE     2,110,229
SUPPORT FOR MIRRORS AND LIKE ARTICLES
Filed April 14, 1934
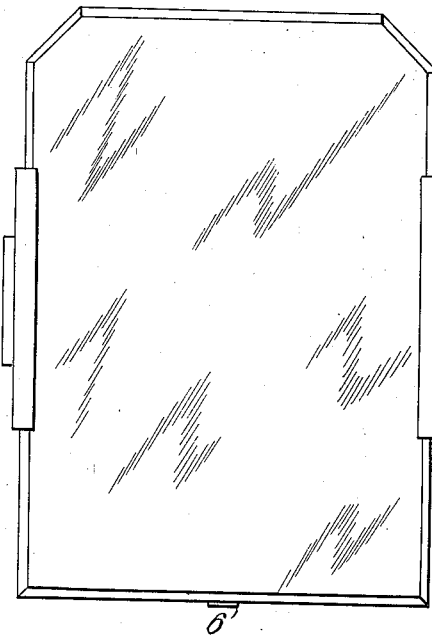
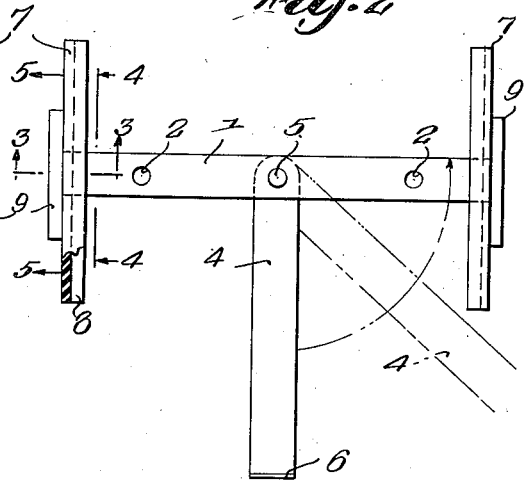
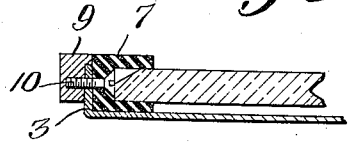
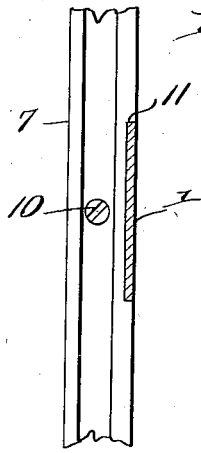
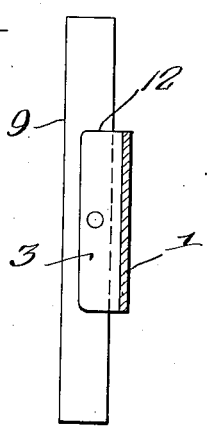
Inventor
Thomas C. Keefe Patented Mar. 8, 1938

2,110,229

UNITED STATES PATENT OFFICE 2,110,229

SUPPORT FOR MIRRORS AND LIKE ARTICLES

Thomas C. Keefe, Boston, Mass., assignor to J. P. Eustis Manufacturing Company, Cambridge, Mass., a corporation of Massachusetts Application April 14, 1934, Serial No. 720,592

6 Claims. (Cl. 88—96)

Objects of the present invention are to provide a support for mirrors and like articles, such as plaques, pictures, etc., which will hold the article firmly in position with a minimum of parts showing at the edges of the article, those parts presenting a unique and pleasing appearance, which can be collapsed into compact form for shipment, which permits the article to be readily removed for cleansing or replacement, which is strong and durable in construction, and which is at the same time simple and economical in construction.

According to this invention the support comprises a backing having an elongate channel member at one edge, and preferably at each of two opposite edges, each channel having an inwardly facing groove to receive the edge of the article. The backing is preferably in the form of a sheet metal member provided with forwardly projecting flanges to the inside of which the channel members may be attached, in which case I preferably provide a supporting member on the outside of each flange with a fastener such as a screw passing through one of the two members and the flange and thence into the other member. These members are also preferably interlocked with the backing as by recessing the two members to receive portions of the backing; for example, one member may be locked against tipping in a plane parallel to the article and the other member may be locked against tipping in a plane perpendicular to the plane of the article.

In another aspect the invention comprises a backing in the form of a cross-arm and a leg pivotally interconnected with the cross-arm intermediate the ends of the latter so that the leg may be swung toward the cross-arm to collapse the support into compact form for shipment or storage. By using the aforesaid elongate channels at the lateral edges of the article the depending leg need have only a narrow ledge or shoulder, preferably in the form of a flange, for supporting the lower edge of the article without overlapping the face of the article.

For the purpose of illustration a typical embodiment of the invention is shown in the accompanying drawing in which, Fig. 1 is a front elevation with a mirror in position on the support;

Fig. 2 is a similar view with the mirror removed and a part of the support broken away;

Fig. 3 is a section on line 3—3 of Fig. 2;

Fig. 4 is a section on line 4—4 of Fig. 2; and

Fig. 5 is a section on line 5—5 of Fig. 2.

The particular embodiment of the invention chosen for the purpose of illustration comprises a backing in the form of a sheet metal cross-arm 1 having openings 2 to mount the arm on a wall and having a forwardly projecting flange 3 at each end, together with a depending leg 4 pivotally mounted on the back of the cross-arm 1 intermediate the ends of the latter by means of a rivet 5 and having a forwardly projecting flange 6 at its lower end. As shown in broken lines in Fig. 2 the depending leg may be swung into parallelism with the cross-arm 1 to collapse the article for shipment or storage.

On the inside of each flange 3 is a channel member 7 having an inwardly facing groove 8 to receive the edge of the mirror and on the outside of each of the flanges 3 is a supporting member 9, the two members being secured together and to the flange by a screw 10 extending from the bottom of the groove 8 through the member 7, thence through the flange and thence threading into the supporting member 9. As shown in Fig. 4 the member 7 is recessed at 11 to receive the cross-arm 1, thereby interlocking the channel member with the cross-arm against tipping in a plane parallel to the article; and as shown in Figs. 3 and 5 the supporting member 9 is recessed at 12 to receive the flange 3 thereby interlocking the supporting member with the flange against tipping in a plane perpendicular to the plane of the mirror. For both structural and artistic purposes the supporting member 9 is preferably made of metal, such as nickle-plated brass, and the channel member 7 is preferably made of black bakelite or some other non-metallic material whose color contrasts with that of the supporting member 9.

It should be understood that the present disclosure is for the purpose of illustration only and that this invention includes all modifications and equivalents which fall within the scope of the appended claims. For example, if the leg 4 is less than half the length of the cross-arm 1 it may be pivoted to the forward side of the cross-arm instead of the back; the members 7 and 9 may also be interlocked directly together against relative tipping in a plane perpendicular to that of the mirror; and either the cross-arm or the depending leg or both may be made adjustable in length.

I claim:

1. A support for mirrors and like articles, said support comprising a rigid backing element of a width at least as great as that of the article to be supported and having forwardly projecting parts adjacent to its opposite edges respectively, a supporting member disposed at the outer side of each of said forwardly projecting parts, a channel member disposed at the inner side of each of said forwardly projecting parts, the channel members being so disposed as to receive opposite edges respectively of the article to be supported, and means for clamping each of the forwardly projecting parts of the backing member between the adjacent supporting and channel members.

2. A support for mirrors and like articles comprising a backing for the article having on the forward side thereof a channel member for receiving the edge of the article to be supported, the channel in the channel member being parallel to the plane of the backing, said channel member having on the rear side thereof a recess providing an abutting surface extending transversely of the plane of the backing and transversely of the channel member and said backing having a surface abutting said surface, thereby to restrain the channel member from tipping relatively to the backing in a plane parallel to the plane of the backing.

3. A support for mirrors and like articles comprising a backing having a forwardly projecting flange, a supporting member on the outside of the flange, a channel member on the inside of the flange, and means extending through one member and the flange and thence into the other member for securing the parts together.

4. A support for mirrors and like articles comprising a cross-arm having a flange at one end, a supporting member on the outside of the flange, a channel member on the inside of the flange and means extending through one member and the flange and thence into the other member for securing the parts together, the supporting member being interlocked with the flange against tipping in a plane perpendicular to the plane of the article.

5. A support for mirrors and like articles comprising a cross-arm having a flange at one end, a supporting member on the outside of the flange, a channel member on the inside of the flange, and means extending through one member and the flange and thence into the other member for securing the parts together, the channel member being interlocked with the cross-arm against tipping in a plane parallel to the plane of the article.

6. A support for mirrors and like articles comprising a cross-arm having a flange at one end, a supporting member on the outside of the flange, a channel member on the inside of the flange, and means extending through one member and the flange and thence into the other member for securing the parts together, the supporting member being interlocked with the flange against tipping in a plane perpendicular to the plane of the article and the channel member being interlocked with the cross-arm against tipping in a plane parallel to the plane of the article.

THOMAS C. KEEFE.